UNITED STATES PATENT OFFICE.

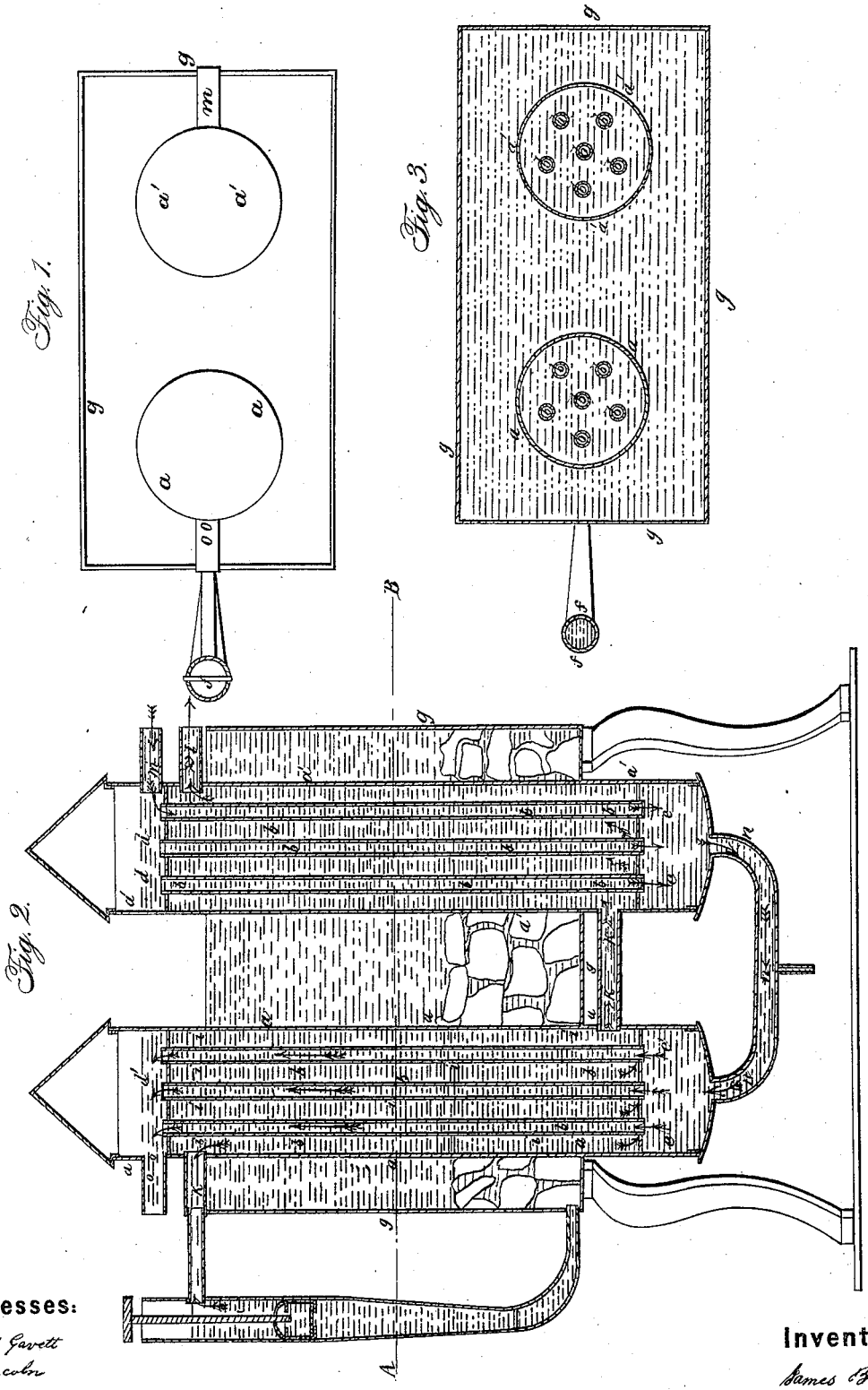
J. BOYLE.
Beer Cooler.
No. 24,004. Patented May 17, 1859.

JAMES BOYLE, OF ROXBURY, MASSACHUSETTS.

APPARATUS FOR COOLING BEER.

Specification of Letters Patent No. 24,004, dated May 17, 1859.

*To all whom it may concern:*

Be it known that I, JAMES BOYLE, of Roxbury, in the county of Norfolk and State of Massachusetts, have invented certain new and useful Improvements in the Process of Cooling Worts, and that the following description, taken in connection with the accompanying drawings, hereinafter referred to, forms a full and exact specification of the same, wherein I have set forth the nature and principles of my said improvements, by which my invention may be distinguished from all others of a similar class, together with such parts as I claim and desire to have secured to me by Letters Patent.

The figures of the accompanying plate of drawings represent my improvements.

Figure 1 is a plan or top view of my improved beer-apparatus. Fig. 2 is a central longitudinal vertical section. Fig. 3 is a horizontal section taken in the plane of the line A, B, Fig. 2.

The present invention relates to the cooling portion of the process of making beer which has heretofore been done by conveying hot beer into large shallow vats exposed to the action of currents of air or by revolving fans. The importance of making the cooling process a sure and quick one will be readily apparent, when it is remembered that often in the warm months of the year it is impossible to brew on account of the heated state of the atmosphere, the temperature of which is then above that to which the wort must be reduced, and moreover even in cool-weather if the cooling is not rapidly effected the beer will be spoiled by acetification or what is termed by brewers "foxing."

My improvements consist in passing the wort or hot beer through a series of tubes placed in two cylinders or other proper receptacles, arranged side by side and connected to each other in such a manner, that the beer shall pass down the tubes of one cylinder and up those of the other, at the same time these tubes being surrounded by a constant supply of ever changing cold water, which is forced down through one cylinder and up that of the other. By this means the beer is rapidly reduced from a temperature of about 120° with which it enters the cooling apparatus, to the required point say 55° or 60°, this being effected whatever may be the temperature of the atmosphere, without regard to the season of the year and without danger of "foxing," results that have never before been successfully accomplished.

$a$ $a$—$a'$ $a'$ in the drawings represent the two cylindrical vessels placed vertically side by side and filled with small tubes $b$ $b$, &c., which are inserted in and held by partitions or heads $c$, $c'$ placed respectively near the tops and bottoms of the vessels $a$ $a$ but having spaces or chambers $d$ $d'$ and $e$ $e'$ for the purposes to be hereinafter explained. The spaces around the tubes $b$ $b$ are kept filled with an ever changing supply of cold water by means of a pump $f$ $f$ which can take the water either from a tank $g$ $g$ partially filled with ice or from a well of water.

The water is pumped in through a pipe $h$ into the water spaces $i$ $i$ around the tubes $b$ $b$ and passes as shown by blue arrows in the drawings down one cylinder $a$ $a$ and up the other the communication between the two being the pipe $k$. The water after being forced through both receptacles is discharged through a nozzle $l$ into the tank $g$ or into an elevated vat to be used for brewing purposes.

The hot beer or wort is fed in as shown by red arrows in the drawings, through a pipe $m$ into the chamber $d$ whence it enters the tubes $b$ $b$ and passes downward into the chamber $e$ $e$ which communicates by means of a bent pipe $n$ with a similar chamber $e'$ in the lower part of the receptacle $a$ and thence upward through the tubes of the receptacle and out at the nozzle $o$, being, during its entire passage down the tubes of one cylinder and up those of the other, surrounded by an ever-changing (and consequently always cold) supply of water, thereby rapidly reducing its temperature to the required degree and by devices occupying but little space whereas by the usual method of cooling in shallow vats a large amount of room was necessarily required. As the hot beer while being fed in will fill some of the tubes $b$ $b$ before others, it follows that the beer in the several pipes may vary in temperature but by the use of the chambers $e$ $e'$, the contents of the tubes will be all united and their temperature equalized, which otherwise would not occur and which is of considerable importance.

What I claim as my invention and desire to have secured to me by Letters Patent is:

The combination—with two or more vessels containing a series of tubes inserted in diaphragm-plates so arranged as to allow communication from the upper part of each vessel to the lower part thereof and vice versa by means of and through the said tubes, of pipes so arranged on either side of the diaphragm as to connect the said vessels alternately at the top and bottom thereof, and of a pump or any suitable device for forcing beer or any other liquid to be cooled, down through one set of tubes and up the other, while a supply of cold water surrounding said tubes is forced in a direction opposite to that of the liquid contained therein, substantially as set forth.

JAMES BOYLE.

Witnesses:
JOSEPH GAVETT,
EZRA LINCOLN.